United States Patent

Kogel et al.

[11] Patent Number: 5,891,236
[45] Date of Patent: Apr. 6, 1999

[54] PROCESS FOR IMPROVING THE COLOR AND BRIGHTNESS OF DISCOLORED GOETHITE-CONTAINING MATERIALS

[75] Inventors: Jessica E. Kogel, Augusta; Randy K. Hall, Deepstep, both of Ga.

[73] Assignee: Thiele Kaolin Company, Sandersville, Ga.

[21] Appl. No.: 844,976

[22] Filed: Apr. 23, 1997

[51] Int. Cl.⁶ .................... C04B 14/10; C04B 33/10
[52] U.S. Cl. ............... 106/486; 106/416; 106/456; 106/457; 501/145; 501/146; 501/149; 501/150
[58] Field of Search .................. 106/456, 486, 106/457, 416; 501/145, 146, 149, 150

[56] References Cited

U.S. PATENT DOCUMENTS

| | | | |
|---|---|---|---|
| 3,589,622 | 6/1971 | Weston | 241/16 |
| 3,730,445 | 5/1973 | Lee et al. | 241/23 |
| 3,737,514 | 6/1973 | King | 423/121 |
| 4,059,672 | 11/1977 | Davis et al. | 423/119 |
| 4,112,047 | 9/1978 | Donaldson | 423/123 |
| 4,289,746 | 9/1981 | Hayakawa et al. | 423/633 |
| 5,011,534 | 4/1991 | Berube et al. | 106/416 |
| 5,147,458 | 9/1992 | Skipper et al. | 106/416 |
| 5,154,767 | 10/1992 | Kunkle et al. | 106/439 |
| 5,190,615 | 3/1993 | Kunkle et al. | 162/135 |
| 5,190,900 | 3/1993 | Toro et al. | 501/148 |
| 5,336,297 | 8/1994 | Mcelroy | 423/100 |
| 5,368,640 | 11/1994 | Pitzer et al. | 106/456 |

OTHER PUBLICATIONS

JAPIO Abstract No. JP363095104A which is an abstract of Japanese Patent Specification No. 63–095104 (Apr.1988).
JAPIO Abstract No. JP406017152A which is an abstract of Japanese Patent Specification No. 06–017152 (Jan.1994).
JAPIO Abstract No. JP406064927A which is an abstract of Japanese Patent Specification No. 06–064927 (Mar.1994).

*Primary Examiner*—Anthony Green
*Attorney, Agent, or Firm*—Jones & Askew LLP

[57] ABSTRACT

Materials, such as kaolin clays, which are discolored by the presence of goethite mineral impurities are first heated to convert the goethite to hematite and then treated to remove the hematite, whereby the color and brightness of the product are improved over the starting material.

14 Claims, No Drawings

PROCESS FOR IMPROVING THE COLOR AND BRIGHTNESS OF DISCOLORED GOETHITE-CONTAINING MATERIALS

TECHNICAL FIELD

This invention relates to a process for improving the color and brightness of discolored goethite-containing materials. In a more specific aspect, this invention relates to a process for improving the color and brightness of kaolin clays and other materials which are discolored by the presence of goethite mineral impurities. This invention also relates to kaolin clays and other materials produced by the process of this invention.

This invention will be described with specific reference to kaolin clays which contain goethite mineral impurities, as kaolin clays are very important and useful materials. However, this invention should be understood as applicable to other materials which contain goethite mineral impurities, with many of these other materials being derived from the processing of kaolin clays. Specific examples of these other goethite-containing materials are the paramagnetic mineral fractions derived from high intensity magnetic separation of kaolin clays, the froth components derived from the froth flotation of kaolin clays, and the impurity fractions derived from the selective flocculation of kaolin clays. Therefore, although especially useful in regard to kaolin clays which contain goethite mineral impurities, this invention is also useful in regard to other goethite-containing materials. Consequently, the term "goethite-containing materials" is used in a broad sense in this application.

BACKGROUND OF THE INVENTION

Kaolin is a naturally occurring, relatively fine, white clay which may be generally described as a hydrated aluminum silicate. After purification and beneficiation, kaolin clay is widely used as a filler and pigment in various materials, such as rubber and resins, and in various coatings, such as paints and coatings for paper.

As a pigment in paper coatings, kaolin clay functions to enhance the color, brightness, gloss, smoothness, printability and opacity of the coated paper.

Generally, for a kaolin clay to be of commercial value, all pigmentary impurity minerals (such as iron oxides) must be substantially removed. Processes typically used to remove these coloring impurities are high intensity magnetic separation, froth flotation, selective flocculation and chemical leaching. To be of commercial value, a kaolin clay must have certain desirable optical properties either in its natural state or as a beneficiated product. These properties include brightness, which is a measure of the amount of light reflected by a mineral pigment, and color which is generally measured using the Hunter L-, a-, and b-value system.

In the Hunter system, L-value provides a measure of lightness where whiteness is positive and blackness is negative, a -value provides a measure of redness where redness is positive and greenness is negative and b-value is a measure of yellowness where yellowness is positive and blueness is negative. In general, for paper coating applications, higher brightness clays are most desirable. As far as color is concerned, clay products having high L-, low a- and low b-values are most desirable.

A significant portion of the crude kaolin clays mined in Georgia are yellow tinted due largely to the presence of very small amounts of goethite (FeOOH). Typically, goethite is associated with kaolinite, the primary clay mineral comprising kaolin, or goethite may be found in association with titanium dioxide minerals such as anatase and rutile.

Two types of clay are mined in Georgia. One type is referred to as soft kaolin. This clay type occurs in Cretaceous age strata and is, in general, characterized by a low total iron content, low total titanium content, relatively coarse particle size and well-ordered crystallites.

The second type is referred to as hard kaolin. This clay type occurs in Tertiary age strata and contains more iron and titanium than the soft kaolins. Not only do the hard kaolin clays contain more iron than the soft kaolins, but this excess iron is found in the kaolinite structure. Another distinguishing feature is that the hard kaolin clays have a relatively fine particle size. Both the hard and soft kaolins can contain goethite which causes a yellow discoloration.

As is well known in the kaolin industry, many of these yellow-discolored clays do not respond to the standard beneficiation methods used for the removal of iron oxide minerals. This lack of response is due to the fact that goethite is less soluble, under typical reductive leaching conditions, than the other iron oxide minerals that are commonly found in kaolin deposits, such as hematite ($Fe_2O_3$). Because these clays are visibly yellow and because they exhibit little or no color improvement in response to reductive leaching (when leached with the levels of sodium dithionite typically used in the kaolin industry), or any other standard beneficiation technique, they are often not considered of commercial quality.

One approach to upgrading these high b-value crude clays is to selectively remove the goethite. Because much of the goethite is submicron in particle size, the removal of goethite using particle size fractionation is not practical. Goethite also resists reductive leaching and is not substantially removed by magnetic separation. Froth flotation removes some goethite; however, this is a costly process.

Therefore, a need exists in the kaolin clay industry for a process which will effectively improve the color and brightness of kaolin clays and other materials which are discolored by the presence of goethite mineral impurities.

SUMMARY OF THE INVENTION

Briefly described, the present invention provides a process for improving the color and brightness of kaolin clays and other materials which are discolored by the presence of goethite mineral impurities. More specifically, this invention provides a process for such improvements in which these kaolin clays and other materials are first heated to convert goethite to hematite and then treated to remove the hematite.

The present invention provides a process by which the color and brightness of the product are improved as compared to the color and brightness of the starting material.

The present invention especially provides kaolin clays which have improved color and brightness and which are useful in paper coating applications.

By heating a goethite-containing kaolin clay or other goethite-containing material within a certain temperature range and for a sufficient period of time, the goethite mineral impurity is converted to hematite. The thermal transformation of goethite to hematite begins at approximately 250° C. and is complete at approximately 350° C., although the hematite formed at this higher temperature is poorly crystallized. The temperature of conversion is controlled by the thermal stability of goethite which is dependent on many factors, including the degree of aluminum substitution within the goethite crystal.

After the goethite has been converted to hematite, we have found that treating the kaolin clay or other material to remove the hematite substantially lowers the b-value and increases the amount of total iron removed relative to similar treatment but without heating. Mineralogical data indicate that this process causes the conversion of goethite to hematite followed by the removal of hematite. Hunter a- and b-values provide a tool for monitoring this mineralogical transformation. As goethite is transformed to hematite, a-value increases. Hunter b-value also increases slightly as a result of hematite formation.

In the prior art, heating combined with leaching has been used to improve coated sheet brightness and opacity. Angel et al. U.S. Pat. No. 4,299,807 teaches that clay heated to minimum brightness prior to leaching causes aggregation of particles and, therefore, allows improved brightness and opacity. However, in the present invention, the clay is heated solely for the purpose of converting goethite to hematite to produce a product having a reduced b-value and improved brightness, and not to aggregate particles. This invention also does not rely on leaching for hematite removal. In fact, we have discovered that some crude kaolin clays do not respond to conventional reductive leaching after the thermal conversion of goethite to hematite. For the removal of hematite, these crudes require magnetic separation or chemical methods not based on sodium-dithionite leaching.

Accordingly, an object of this invention is to provide a process for improving the color and brightness of discolored kaolin clays and other materials.

Another object of this invention is to provide a process for improving the color and brightness of kaolin clays and other materials which are discolored by the presence of goethite mineral impurities.

Another object of this invention is to provide a process for producing kaolin clays which are useful in paper coating applications.

Still another object of this invention is to provide kaolin clays and other materials which have improved color and brightness.

Still another object of this invention is to provide kaolin clays and other materials which have been treated to remove discoloring goethite mineral impurities.

Still another object of this invention is to provide kaolin clays and other materials which have improved color and brightness and which have been treated to remove goethite mineral impurities.

Yet still another object of this invention is to provide kaolin clays which are useful in paper coating applications.

These and other objects, features, and advantages of this invention will become apparent from the following detailed description.

DETAILED DESCRIPTION OF THE INVENTION

In accordance with the present invention, a kaolin clay or other starting material containing goethite mineral impurities is first heated to a temperature within the range of about 250 to about 350° C. for a time which is sufficient to substantially convert the goethite mineral impurities to hematite, and then the heated material is treated to remove the hematite. The product has a color and brightness which are improved as compared to the starting material.

The starting material is preferably a kaolin clay, which may be a coarse-grained soft kaolin clay or a fine-grained hard kaolin clay.

If desired, the kaolin clay starting material may be degritted by standard industry techniques prior to the heating step of this process.

Well-known techniques and equipment can be used to heat the starting material to the range of about 250 to about 350° C.

The heating step is continued for a time which is sufficient to substantially convert the goethite mineral impurities to hematite. This time will vary depending upon certain factors, such as the kaolin clay starting material.

By the term "substantially", we recognize that in some instances a complete conversion (i.e., 100 percent) of goethite to hematite may not occur. However, the conversion will be substantially complete when the heating step is terminated.

After conversion, the heated kaolin clay is treated to substantially remove the hematite. The critical factor in this step is the removal of the hematite to obtain a product having color and brightness which are improved when compared to the starting material. Again, by the term "substantially", we recognize that in some instances a complete removal (i.e., 100 percent) of hematite may not occur. However, a substantial removal will be indicated by color. For example, a yellowish color indicates the presence of goethite, while the conversion of goethite to hematite is indicated by the yellowish color changing to a pinkish color.

The removal of hematite may be accomplished by standard techniques in the industry, such as magnetic separation, leaching, selective flocculation, flotation, microwave beneficiation such as described in copending Bruns, Kogel and Lewis U.S. patent application Ser. No. 08/839,036, entitled "Process for the Microwave Beneficiation of Discolored Kaolin Clay Materials" and filed Apr. 23, 1997, or other beneficiation processes.

As mentioned above, the process of this invention, while described with specific reference to kaolin clays which contain goethite mineral impurities, is also applicable to other starting materials which contain goethite mineral impurities.

The present invention is further illustrated by the following examples which are illustrative of certain embodiments designed to teach those of ordinary skill in the art how to practice this invention and to represent the best mode contemplated for carrying out this invention.

EXAMPLE I

A yellow, fine-grained, hard kaolin clay with an initial b-value of 8, is degritted and settled to approximately 94% <2 μm. The clay is then heated to temperatures ranging from 250° C. to 550° C. for either 30 minute or 1 hour intervals and leached using 0, 6 and 12 lb/ton sodium dithionite. GE brightness and Hunter values are determined for all samples and changes in the iron oxide mineralogy are monitored. The amount of iron removed by leaching is measured by X-ray fluorescence spectroscopy (XRF). The test results are shown in Table A.

Because most of the iron impurities are associated with the kaolinite structure, and leachable iron rarely amounts to more than 20 percent of the total iron content, the percentages of iron removed by the process of this invention are significant. Although not shown in Table A, this process removes substantially all of the leachable iron.

The greatest improvement in b-value is obtained by heating the clay to 450° C. for 1 hour and then leaching with 12 lb/ton Na-dithionite. This treatment yields a 27% improvement or a 1.6 point decrease in b-value relative to conventional leaching. Maximum a-value is also observed at this temperature (prior to leaching) due to the formation of hematite. Hunter b-value also increases (prior to leaching) as a result of heating. Mineralogical data indicate that the increased b-value can be attributed to hematite alone and not goethite.

Maximum brightness improvement, however, occurs after heating to 350° C. for 30 minutes and leaching at a rate of 12 lb/ton. Under these conditions, brightness improves approximately 2.5 points and the amount of iron leached from the clay doubles relative to the amount removed by conventional leaching. This brightness improvement is related to the removal of iron oxide.

Heating to 550° C. results in significantly lower brightness values and slightly elevated b-values. Economically feasible levels of leach do not restore brightness to the same level that is achieved by conventional leaching without heating.

TABLE A

| Temperature (°C.) | Time (minutes) | Leach #/ton | GE Br | L | a | b | % Fe removed |
|---|---|---|---|---|---|---|---|
| No added heat | 0 | 0 | 78.51 | 94.15 | 0.23 | 8.00 | 0 |
|  |  | 6 | 81.40 | 94.46 | 0.15 | 6.31 | 7 |
|  |  | 12 | 82.06 | 94.47 | 0.19 | 5.80 | 8 |
| 250 | 60 | 0 | 72.81 | 91.76 | 1.67 | 9.00 | — |
|  |  | 6 | 83.42 | 94.66 | −0.02 | 5.13 | — |
|  |  | 12 | 84.00 | 94.74 | −0.03 | 4.81 | — |
| 350 | 30 | 0 | 70.07 | 90.24 | 3.58 | 9.23 | 0 |
|  |  | 6 | 80.70 | 93.87 | 1.09 | 6.02 | 13 |
|  |  | 12 | 84.63 | 94.96 | 0.34 | 4.57 | 16 |
| 350 | 60 | 0 | 68.29 | 89.27 | 3.89 | 9.40 | — |
|  |  | 6 | 82.26 | 94.29 | 0.51 | 5.47 | — |
|  |  | 12 | 84.61 | 94.83 | 0.11 | 4.48 | — |
| 450 | 60 | 0 | 65.26 | 88.01 | 4.29 | 9.67 | — |
|  |  | 6 | 81.45 | 93.57 | 0.42 | 5.09 | — |
|  |  | 12 | 83.32 | 93.95 | 0.13 | 4.21 | — |
| 550 | 30 | 0 | 66.71 | 88.45 | 4.16 | 9.50 | 0 |
|  |  | 6 | 76.73 | 92.06 | 1.6 | 6.54 | 12 |
|  |  | 12 | 79.60 | 93.06 | 0.64 | 5.72 | 15 |

EXAMPLE II

A highly discolored crude soft kaolin clay with a b-value of 13.57 is degritted and heated to temperatures ranging from 0 to 550° C. After heating, the clay is then leached using 0, 3, 6, and 9 lb/ton of sodium dithionite. GE brightness and Hunter values are then measured along with percent Fe removed. The test results are shown in Table B.

In this case, the hematite that is formed by the thermal dehydration of goethite is only partially removed by sodium dithionite leaching when leached with the levels of sodium dithionite typically used in the kaolin industry. Complete removal of hematite requires higher leach levels and/or other processes such as magnetic separation.

Hunter values indicate that hematite formation begins at around 250° C. and continues throughout the temperature range examined. With subsequent leaching, neither a- nor b-value decrease to levels below those obtained by conventional leaching without heating.

TABLE B

| Temperature (°C.) | Time (minutes) | Leach #/ton | GE Br | L | a | b | % Fe removed |
|---|---|---|---|---|---|---|---|
| No added heat | 0 | 0 | 65.38 | 91.30 | 0.46 | 14.39 | 0 |
|  |  | 3 | 67.07 | 91.60 | 0.28 | 13.45 | 1 |
|  |  | 6 | 69.17 | 92.00 | 0.13 | 12.38 | 8 |
|  |  | 9 | 70.56 | 92.30 | 0.08 | 11.70 | 12 |
| 250 | 60 | 0 | 58.46 | 87.35 | 3.61 | 14.83 | 0 |
|  |  | 3 | 62.72 | 89.04 | 2.50 | 13.60 | 5 |
|  |  | 6 | 65.87 | 90.34 | 1.67 | 12.80 | 11 |
|  |  | 9 | 69.02 | 91.5 | 1.04 | 11.83 | 15 |
| 350 | 60 | 0 | 49.08 | 82.10 | 7.81 | 16.04 | 0 |
|  |  | 3 | 51.23 | 83.55 | 6.91 | 16.06 | 3 |
|  |  | 6 | 53.94 | 84.90 | 5.97 | 15.51 | 10 |
|  |  | 9 | 55.90 | 85.85 | 5.31 | 15.05 | 16 |
| 450 | 60 | 0 | 48.75 | 81.60 | 8.22 | 15.77 | 0 |
|  |  | 3 | 50.41 | 83.10 | 7.39 | 16.15 | 5 |
|  |  | 6 | 52.62 | 84.30 | 6.55 | 15.80 | 11 |
|  |  | 9 | 55.49 | 85.50 | 5.82 | 14.88 | 18 |
| 550 | 60 | 0 | 47.41 | 81.02 | 8.88 | 16.17 | 0 |
|  |  | 3 | 48.36 | 81.92 | 8.39 | 16.47 | 3 |
|  |  | 6 | 50.33 | 83.00 | 7.67 | 16.11 | 7 |
|  |  | 9 | 51.96 | 83.90 | 7.10 | 15.88 | 12 |

EXAMPLE III

The same crude as shown in Example II is subjected to magnetic separation after heating to 350° C. for 1 hour. The test results are shown in Table C.

The color and brightness data indicate that the magnetic separator removes some of the hematite formed as a result of the thermal treatment. Increased retention time and/or increased magnet strength is required to achieve 100% removal of the hematite. Magnetic separation used in combination with leach results in improved hematite removal.

TABLE C

| Process | Leach (#/t) | GE Br | L | a | b | % Fe removed |
|---|---|---|---|---|---|---|
| No magnetic separation | 0 | 49.08 | 82.10 | 7.81 | 16.04 | 0 |
|  | 3 | 51.23 | 83.55 | 6.91 | 16.06 | 3 |
|  | 6 | 53.94 | 84.90 | 5.97 | 15.51 | 10 |
|  | 9 | 55.90 | 85.85 | 5.31 | 15.05 | 16 |
| Magnetic separation (1 min retention) | 0 | 53.95 | 84.82 | 6.34 | 15.34 | NM |
|  | 6 | 57.21 | 86.40 | 5.31 | 14.64 | NM |
|  | 12 | 59.81 | 87.47 | 4.60 | 13.89 | NM |

NM = not measured

EXAMPLE IV

A degritted and settled soft kaolin is heated to 300° C. for 1 hour and leached with 0, 6 and 12 lb/ton of sodium dithionite. As with Examples I and II, the goethite is converted to hematite. The test results are shown in Table D.

Subsequent leaching causes a reduction in b-value and an increase in GE brightness due to the removal of the hematite. Both GE brightness and b-value are improved relative to conventional reductive leaching.

TABLE D

| Temperature (°C.) | Time | Leach (#/t) | GE Br | L | a | b | % Fe removed |
|---|---|---|---|---|---|---|---|
| No added heat | 0 | 0 | 80.72 | 94.62 | 0.27 | 7.04 | 0 |
|  |  | 6 | 87.01 | 95.46 | 0.43 | 3.50 | 11 |
|  |  | 12 | 87.30 | 95.56 | 0.43 | 3.38 | 14 |

TABLE D-continued

| Temperature (°C.) | Time | Leach (#/t) | GE Br | L | a | b | % Fe removed |
|---|---|---|---|---|---|---|---|
| 300 | 60 | 0 | 71.41 | 90.79 | 3.16 | 8.94 | 0 |
|  |  | 6 | 87.74 | 95.54 | 0.41 | 3.12 | 18 |
|  |  | 12 | 87.80 | 95.50 | 0.48 | 2.96 | 18 |

This invention has been described in detail with particular reference to certain embodiments, but variations and modifications can be made without departing from the spirit and scope of the invention as defined in the following claims.

What is claimed is:

1. A process for improving the color and brightness of a kaolin-containing starting material which contains goethite mineral impurities, wherein the process comprises the following sequential steps:
    A. heating the starting material to a temperature within the range of about 250 to about 350° C. for a time which is sufficient to substantially convert the goethite mineral impurities to hematite; and then
    B. treating the heated material to substantially remove the hematite and produce a product, whereby the color and brightness of the product are improved as compared to the starting material.

2. A process as defined by claim 1 wherein the starting material is a coarse-grained soft kaolin clay.

3. A process as defined by claim 1 wherein the starting material is a fine-grained hard kaolin clay.

4. A process as defined by claim 1 wherein the starting material is a degritted crude kaolin clay.

5. A process as defined by claim 1 wherein the heated material is treated by magnetic separation, leaching, selective flocculation, flotation or microwave beneficiation.

6. A process as defined by claim 5 wherein the heated material is treated by magnetic separation.

7. A process as defined by claim 5 wherein the heated material is treated by leaching.

8. A material having improved color and brightness is produced by a process which comprises the sequential steps of;
    A. heating a kaolin-containing starting material which contains goethite material impurities to a temperature within the range of about 250 to about 350° C. for a time which is sufficient to substantially convert the goethite mineral impurities to hematite; and then
    B. treating the heated material to substantially remove the hematite and produce a product, whereby the color and brightness of the product are improved as compared to the starting material.

9. A material as defined by claim 8 wherein the starting material is a coarse-grained soft kaolin clay.

10. A material as defined by claim 8 wherein the starting material is a fine-grained hard kaolin clay.

11. A material as defined by claim 8 wherein the starting material is a degritted crude kaolin clay.

12. A material as defined by claim 8 wherein the heated material is treated by magnetic separation, leaching, selective flocculation, flotation or microwave beneficiation.

13. A material as defined by claim 12 wherein the heated material is treated by magnetic separation.

14. A material as defined by claim 12 wherein the heated material is treated by leaching.

* * * * *